United States Patent
Lee

(10) Patent No.: US 7,543,933 B2
(45) Date of Patent: Jun. 9, 2009

(54) EYEGLASSES

(75) Inventor: Hsing-Jen Lee, Tainan (TW)

(73) Assignee: High Rainbow Ent Co., Ltd., Tainan (TW)

( * ) Notice: Subject to any disclaimer, the term of this patent is extended or adjusted under 35 U.S.C. 154(b) by 0 days.

(21) Appl. No.: 12/106,295

(22) Filed: Apr. 19, 2008

(65) Prior Publication Data

US 2009/0073377 A1   Mar. 19, 2009

(30) Foreign Application Priority Data

Sep. 14, 2007   (TW) .............................. 96134537 A

(51) Int. Cl.
*G02C 5/12* (2006.01)
(52) U.S. Cl. ..................... 351/138; 351/80; 351/137; 351/136
(58) Field of Classification Search ................. 351/138, 351/80, 136, 78, 137, 139, 41
See application file for complete search history.

(56) References Cited

U.S. PATENT DOCUMENTS

| | | | | |
|---|---|---|---|---|
| 2,080,853 | A * | 5/1937 | Nelson | 351/90 |
| 4,205,905 | A * | 6/1980 | Abel et al. | 351/138 |
| 4,464,025 | A | 8/1984 | Lhospice | |
| 4,527,871 | A | 7/1985 | Sohyer | |
| 4,556,300 | A | 12/1985 | Dietrich | |
| 4,792,222 | A * | 12/1988 | Labenz et al. | 351/136 |
| 5,007,726 | A | 4/1991 | Suzuki et al. | |
| 5,526,070 | A | 6/1996 | Simioni | |
| 5,581,312 | A * | 12/1996 | Chen | 351/138 |
| 5,689,835 | A | 11/1997 | Chao | |
| 6,283,592 | B1 | 9/2001 | Lin | |
| 6,340,228 | B1 | 1/2002 | Cummings et al. | |
| 6,364,480 | B1 * | 4/2002 | Chen | 351/138 |
| 6,386,705 | B1 | 5/2002 | Chen | |
| 6,554,423 | B2 * | 4/2003 | Kroman | 351/138 |
| 6,568,806 | B1 | 5/2003 | Lin | |
| 6,644,806 | B2 | 11/2003 | Wu | |
| 6,886,935 | B2 | 5/2005 | Negishi et al. | |
| 6,896,365 | B1 | 5/2005 | Lin | |
| 6,976,756 | B1 | 12/2005 | Chen | |
| 7,086,734 | B2 | 8/2006 | Chen | |
| 7,314,277 | B2 | 1/2008 | Lin | |
| 7,347,545 | B1 | 3/2008 | Jannard et al. | |

* cited by examiner

*Primary Examiner*—Hung X Dang
(74) *Attorney, Agent, or Firm*—Ming Chow; Sinorica, LLC

(57) ABSTRACT

This invention relates to a nose pad of eyeglasses, an eyeglass assembly, and a method of fabricating the same. An eyeglass assembly comprises a frame, lenses inlaid in the frame, a nose bridge near a center of the frame and corresponding to a user's nose ridge, wing portions below the nose bridge for holding the lenses and a pair of bent protruding pillars integrally formed at the wing portions facing the user's face for receiving a pair of elastic nose pads assembled thereto. Each of the elastic nose pads has at least one opening and a cavity extending inwardly from the opening to an interior of the nose pad so that the elastic nose pad can have a recoverable deformation when an external force acts thereon and thereby the corresponding bent protruding pillar of the frame can be inserted in the cavity.

16 Claims, 7 Drawing Sheets

Providing a frame and lenses inlaid in the frame, wherein a nose bridge is formed near a center of the frame and corresponding to a nose ridge of a user who wears the eyeglass assembly, and a wing portion is extended from each of two sides of the frame and below the nose bridge for holding the lenses, in which at least a pair of bent protruding pillars is integrally formed at a surface of the wing portions facing a face of a user who wears the eyeglass assembly and each of the bent protruding pillars comprises two bent segments extending in different axial directions.

Providing a pair of elastic nose pads, wherein each said elastic nose pad has at least one opening and a cavity extending inwardly from the opening to an interior of the nose pad so that when an external force acts on the elastic nose pad, the elastic nose pad can have a recoverable deformation from the opening down to the cavity and thereby the corresponding bent protruding pillar of the frame can be inserted in the cavity by the two bent segments extending in the different axial directions.

Fig. 4

Providing a frame and a lens inlaid in the frame, wherein a nose bridge is formed near a center of the lens and corresponding to a nose ridge of a user who wears the eyeglass assembly, and at least a pair of bent protruding pillars is integrally formed below the nose bridge at each of two sides of the lens and at a surface of the lens facing a face of a user who wears the eyeglass assembly, in which each of the bent protruding pillars comprises two bent segments extending in different axial directions.

Providing a pair of elastic nose pads, wherein each said elastic nose pad has at least one opening and a cavity extending inwardly from the opening to an interior of the nose pad so that when an external force acts on the elastic nose pad, the elastic nose pad can have a recoverable deformation from the opening down to the cavity and thereby the corresponding bent protruding pillar of the lens can be inserted in the cavity and engage the lens can be inserted in the cavity by the two bent segments extending in the different axial directions.

Fig. 5

EYEGLASSES

BACKGROUND OF THE INVENTION

1. Technical Field

The present invention relates to a nose pad of eyeglasses, an eyeglass assembly, and a method of fabricating the same. More particularly, the present invention relates to an elastic nose pad of eyeglasses.

2. Description of Related Art

Please refer to FIG. 1 for a conventional eyeglass assembly 20 that primarily comprises a glass frame 21, lenses 22 and a nose pad set 23. The nose pad set 23 is preformed with cavities 231 at inner lateral sides thereof while a fork 24 is deposited at a center of the frame 21 for providing a plurality of protruding pillars 241 so that the nose pad set 23 and the frame 21 can be combined as an integral by inserting the protruding pillars 241 into the cavities 231 preformed on the nose pad set 23 and fixed mutually by filling glue between the cavities 231 and the protruding pillars 241. In some prior disclosure, such as Taiwan Patent No. M265628, the aforementioned assembling method for a nose pad set has been taught. However, while the nose pad set 23 is typically made of an elastic material, such as silica gel or rubber, it tends to come off the protruding pillars 241 during transportation or long-term use due to its elasticity. Moreover, though filling glue between the nose pad set 23 and the protruding pillars 241 facilitates enhancing the attachment of the nose pad set 23 to the protruding pillars 241, it may also cause undesirable glue overflow that adversely affect the appearance of the entire eyeglass assembly in an esthetics respect. In view of the defects of the conventional nose pad set about easy coming off and glue overflow, a need exists for an eyeglasses nose pad that is not easy to come off an eyeglass assembly it attached to and is free of glue overflow.

SUMMARY OF THE INVENTION

In the attempt to solve the foregoing problem of the prior arts, the present invention provides an eyeglasses nose pad, an eyeglass assembly and a method of fabricating the same, wherein the eyeglasses is constructed from a frame and lenses inlaid in the frame. A nose bridge is formed near a center of the frame corresponding to the nose ridge of a user who wears the eyeglass assembly. A wing portion is extended from each of two sides of the frame and below the nose bridge for holding the lenses. The present invention is characterized in that at least one bent protruding pillar is integrally formed at a surface of each said wing portion facing a face of a user who wears the frame, wherein each of the bent protruding pillars comprises two segments extending in different axial directions so that a pair of nose pads made of an elastic material can be assembled to the bent protruding pillars. In addition, each said elastic nose pad has at least one opening and a cavity extending inwardly from the opening to an interior of the nose pad so that the elastic nose pad can have a recoverable deformation from the opening down to the cavity and thereby the corresponding bent protruding pillar of the frame can be inserted in the cavity when an external force acts thereon. The bent protruding pillar efficiently engages with the cavity of the elastic nose pad by the two segments extending in the two different axial directions. Furthermore, due to the elasticity of the nose pad, reinstatement of the elastic nose pad after said deformation forces the elastic nose pad itself to combine with the bent protruding pillar so as to achieve a firm combination with reduced risk of accidentally coming off.

In addition to the nose bridge and wing portions for receiving the nose pads, the present invention, in another embodiment, further provides a nose pad, a frame, a lens portion and an eyeglass assembly by using the lens portion of an integral form. The eyeglass assembly is constructed from a frame and a lens portion inlaid in the frame, wherein a nose bridge is formed near a center of the lens portion corresponding to a nose ridge of a user who wears the eyeglass assembly, and a pair of bent protruding pillars is integrally formed at a surface of the lens portion facing a face of the user, in which each of the bent protruding pillars comprises two segments extending in different axial directions so that a pair of elastic nose pads can be assembled to the bent protruding pillars. Therein, each said elastic nose pad has at least one opening and a cavity extending inwardly from the opening to an interior of the nose pad so that the elastic nose pad can have a recoverable deformation from the opening down to the cavity and thereby the corresponding bent protruding pillar of the frame can be inserted in the cavity when an external force acts thereon. The bent protruding pillar efficiently engages with the cavity of the elastic nose pad by the two segments extending in the two different axial directions. Furthermore, due to the elasticity of the nose pad, reinstatement of the elastic nose pad after said deformation forces the elastic nose pad itself to combine with the bent protruding pillar so as to achieve a firm combination with reduced risk of accidentally coming off.

Therefore, a primary objective of the present invention is to provide an eyeglass assembly, wherein the nose pads assembled thereto are not easy to come off.

A secondary objective of the present invention is to provide an eyeglass assembly, wherein the nose pads are combined therewith without glue, thereby eliminating glue overflow thereon and providing an improved appearance thereof in an esthetics respect.

Another objective of the present invention is to provide a method of fabricating an eyeglass assembly, wherein the nose pads assembled on the eyeglass assembly are not easy to come off.

Another objective of the present invention is to provide a method of fabricating an eyeglass assembly, wherein the nose pads are combined with the eyeglass assembly without glue, thereby eliminating glue overflow on the eyeglass assembly and providing the eyeglass assembly with an improved appearance in an esthetics respect.

Another objective of the present invention is to provide an eyeglass frame, wherein the nose pads assembled thereon are not easy to come off.

Another objective of the present invention is to provide an eyeglass frame, wherein the nose pads are combined therewith without glue, thereby eliminating glue overflow thereon and providing an improved appearance thereof in an esthetics respect.

Another objective of the present invention is to provide an eyeglass lens portion, wherein the nose pads assembled thereon are not easy to come off.

Another objective of the present invention is to provide an eyeglass lens portion, wherein the nose pads are combined therewith without glue, thereby eliminating glue overflow thereon and providing an improved appearance thereof in an esthetics respect.

Still another objective of the present invention is to provide an elastic nose pad, which is not easy to come off an eyeglass assembly it assembled to.

Yet another objective of the present invention is to provide an elastic nose pad, which is combined with an eyeglass assembly without glue, thereby eliminating glue overflow on the eyeglass assembly and providing the eyeglass assembly with an improved appearance in an esthetics respect.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein:

FIG. 4 is a flow chart illustrating a method of fabricating an eyeglass assembly according to another embodiment of the present invention;

FIG. 5 is a flow chart illustrating a method of fabricating an eyeglass assembly according to still another embodiment of the present invention.

DETAILED DESCRIPTION OF THE PREFERRED EMBODIMENT

While the present invention discloses a nose pad of eyeglasses, an eyeglass assembly and the method of fabricating the same, it is to be understood that the basic principle relating to the structures of those has been know to people skilled in the art and needs not to be described herein in detail. Meantime, it is to be stated that the accompanying drawings for being read in conjunction with the following descriptions aim to express structural features related to the characteristics of the present invention and thus are not, and do not need, to be made in scale.

Figure 1:
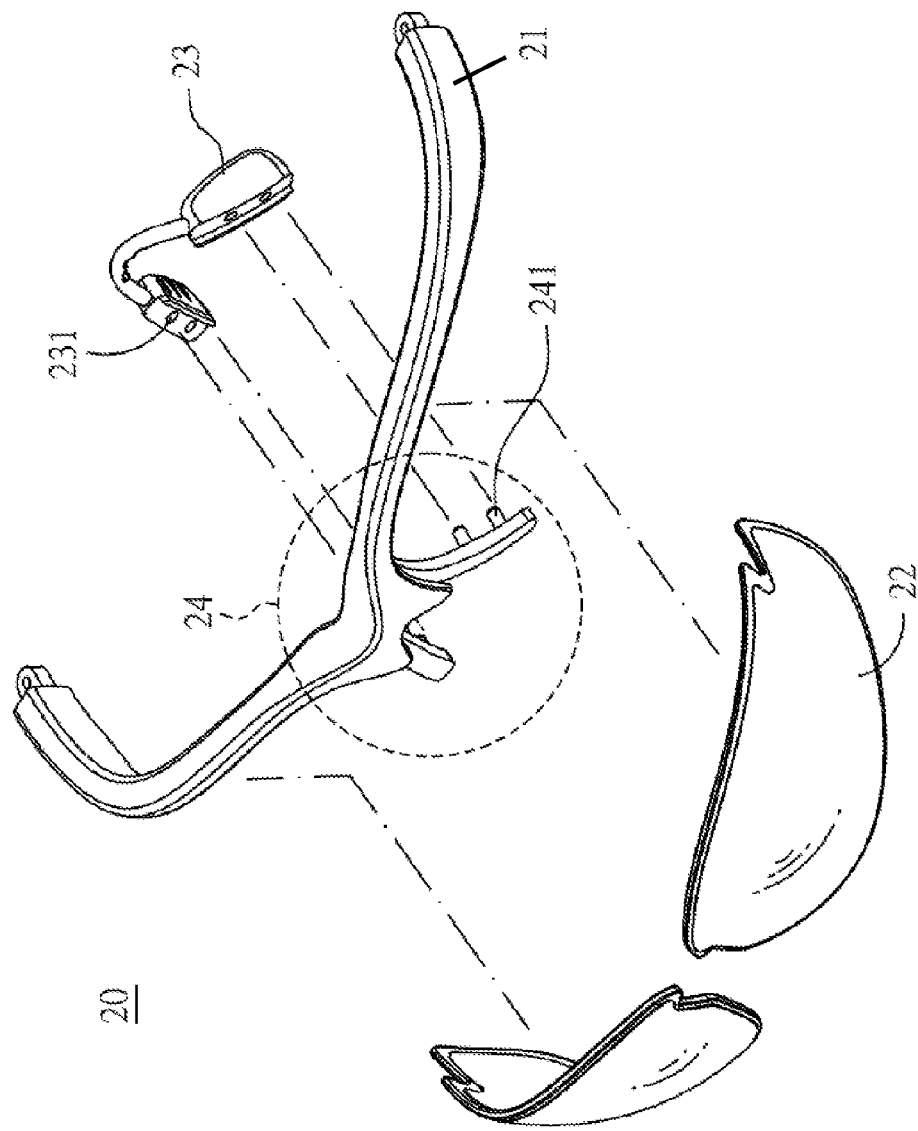
FIG. 1 is a schematic drawing showing a conventional eyeglass assembly.
Figure 2:
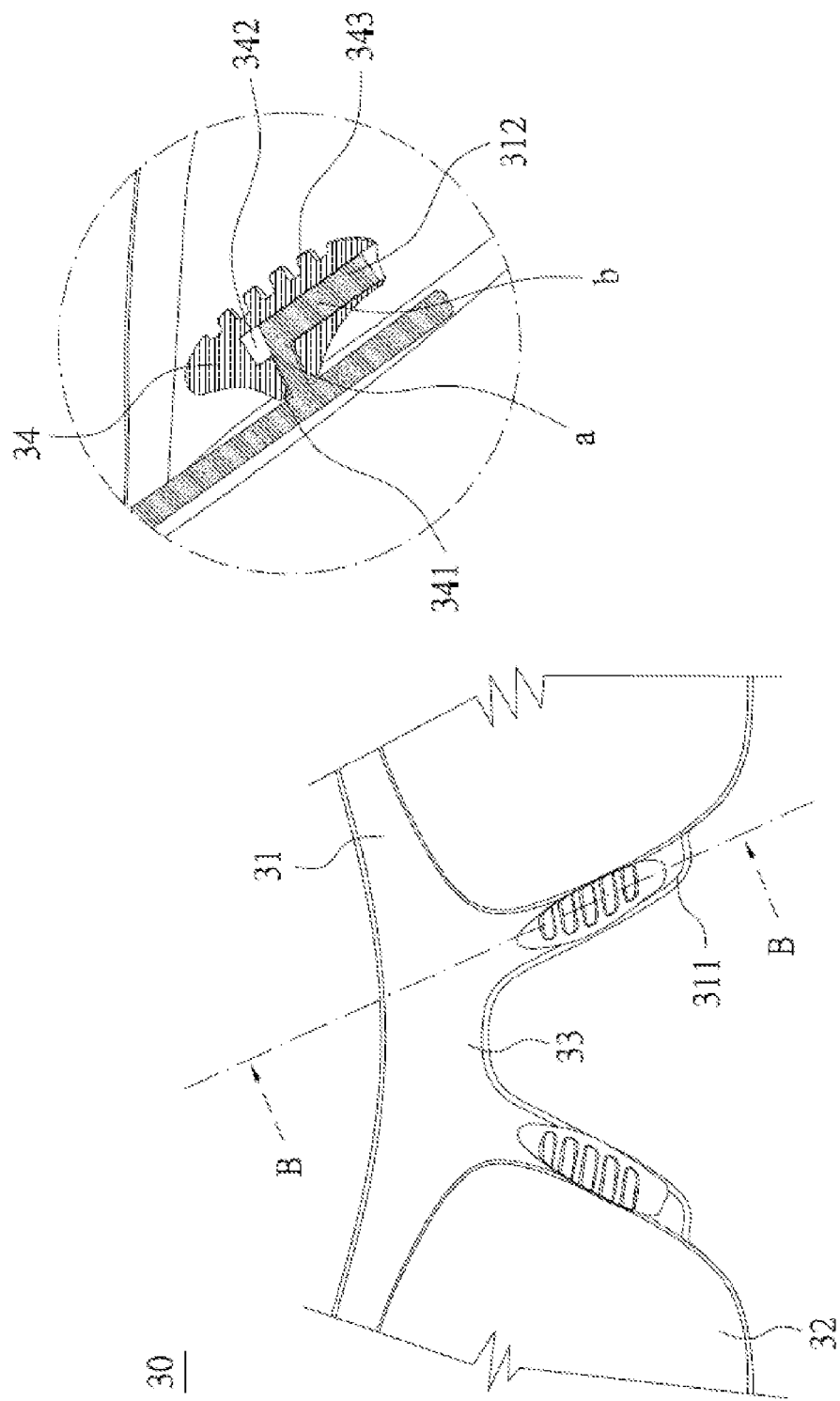
FIG. 2 is a schematic drawing showing an eyeglass assembly according to one embodiment of the present invention.

Please refer to FIG. 2 for a first preferred embodiment of the present invention, wherein an eyeglass assembly 30 is primarily composed of a frame 31 and lenses 32 inlaid in the frame 31. A nose bridge 33 is formed near a center of the frame 31 and corresponding to a nose ridge of a user who wears the eyeglass assembly 30. A wing portion 311 is extended from each of two sides of the frame 31 and below the nose bridge 33. The present embodiment is characterized in that at least one bent protruding pillar 312 is integrally formed at a surface of each said wing portion 311 facing a face of the user, wherein each of the bent protruding pillars 312 comprises two segments (a, b) extending in different axial directions so that a pair of elastic nose pads 34 can be assembled to the bent protruding pillars 312. The elastic nose pads 34 may be made of a material selected from the group consisting of silica gel, rubber, resin and plastic. In addition, each said elastic nose pad 34 has at least one opening 341 and a cavity 342 extending inwardly from the opening 341 to an interior of the nose pad 34 so that the elastic nose pad 34 can have a recoverable deformation from the opening 341 down to the cavity 342 and then sheath the corresponding bent protruding pillar 312 of the frame 31 when an external force acts thereon. The bent protruding pillar 312 efficiently engages with the cavity 342 of the elastic nose pad 34 by the two segments (a, b) extending in the two different axial directions. Furthermore, due to the elasticity of the nose pad 34, reinstatement of the elastic nose pad 34 after said deformation forces the elastic nose pad 34 itself to combine with the bent protruding pillar 312 so as to achieve a firm combination with reduced risk of accidentally coming off.

In a preferred embodiment, the at least one said cavity 342 of the elastic nose pad 34 engaged with at least one said bent protruding pillar 312 at the wing portion 311 of the nose bridge 33. Namely, the cavity 342 preferably has a diameter slightly smaller than a diameter of the bent protruding pillar 312 so that a combination such formed therebetween can achieve firmness without addition of glue. Of course, the cavity 342 and the bent protruding pillar 312 may be alternatively combined by means of clearance fix.

Besides, the at least one said cavity 342 of the elastic nose pad 34 and the at least one said bent protruding pillar 312 at the wing portion 311 of the nose bridge 33, which are combined by means of engagement or clearance fix, may be formed in various matching forms. In a preferred embodiment, the at least one said cavity 342 of the elastic nose pad 34 and the at least one said bent protruding pillar 312 at the wing portion 311 of the nose bridge 33 may be designed as a round hole and a round post having various diameters while having matching sizes, or may be designed as an elliptic hole and an elliptic post having various diameters while having matching sizes. Of course, in another embodiment, the at least one said cavity 342 of the elastic nose pad 34 and the at least one said bent protruding pillar 312 at the wing portion 311 of the nose bridge 33 may be designed as a square hole and a square post having various diameters while having matching sizes, or may be designed as a rectangle hole and a rectangle post having various diameters while having matching sizes. Further, the cavity 342 of the elastic nose pad 34 and the bent protruding pillar 312 may each have a sectional shape selected from the group consisting of round, elliptic, square, rectangle, diamond, and taper. In practice, the sectional shapes of the cavity 342 of the elastic nose pad 34 and the bent protruding pillar 312 may be of any shape and are not to be limited by the present invention as long as the cavity 342 of the elastic nose pad 34 and the bent protruding pillar 312 can mutually engage.

Moreover, in the above embodiment, the at least one cavity 342 of the elastic nose pad 34 may penetrate through the elastic nose pad 34 and can have a recoverable deformation under an external force to become a shape similar to that of the at least a pair of bent protruding pillars 312 at the wing portion 311 of the nose bridge 33. Meantime, the at least a pair of bent protruding pillars 312 at the wing portions 311 of the nose bridge 33 may be curvedly bent, and may particularly have an angle ranging from approximately 45 to approximately 150 degrees. In a preferred embodiment, the bent protruding pillar 312 has an angle of approximately 90 degrees. However, the bent protruding pillar 312 may be formed in any bent form as long as the bent form can force the cavity 342 of the elastic nose pad 34 to perform said deformation.

Now please refer back to FIG. 2 again. In each said elastic nose pad 34, a corrugated surface 343 is provided at a side opposite to the side formed with the opening 341, namely the side to contact a nose ridge of a user wearing the eyeglass assembly 30, so as to prevent the elastic nose pad 34 from excessively pressing the user's nose ridge and provide a slight interval between the nose pad 34 and the user's nose ridge for providing a more comfortable wearing experience.

Figure 3A:
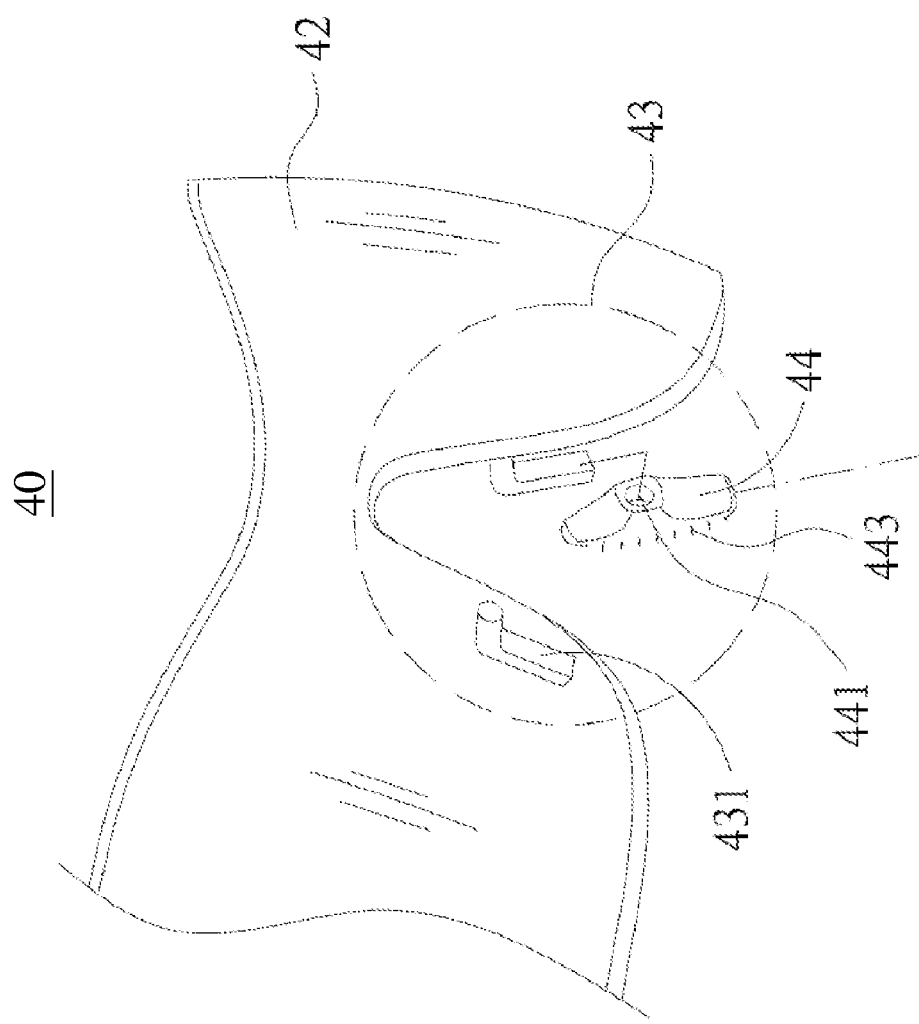
FIG. 3A is a schematic drawing showing an eyeglass assembly according to another embodiment of the present invention.
Figure 3B:
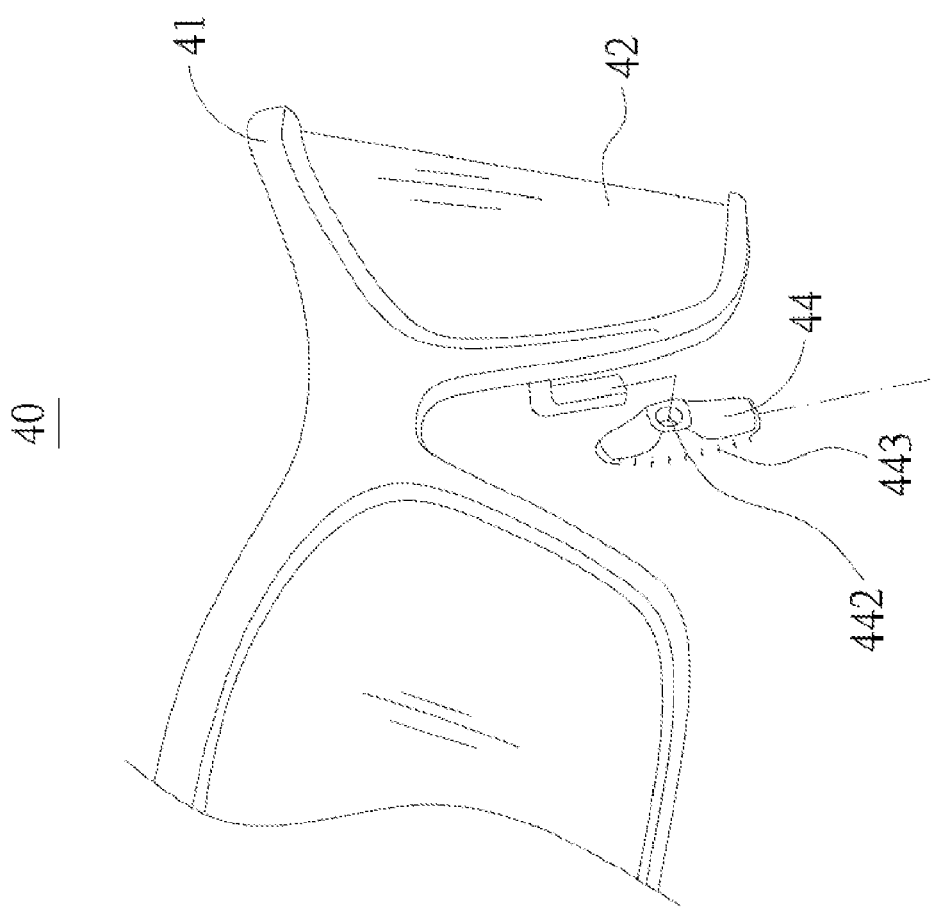
FIG. 3B is a schematic drawing showing an eyeglass assembly according to another embodiment of the present invention.

Please refer to FIGS. 3A and 3B for a second preferred embodiment of the present invention, wherein an eyeglass assembly 40 is primarily composed of a frame 41 and a lens portion 42 or lenses 42 inlaid in the frame 41. A nose bridge 43 is formed near a center of the lens portion 42 or the frame 41 and corresponding to a nose ridge of a user who wears the eyeglass assembly 40. At least a pair of bent protruding pillars 431 is integrally formed at a surface of the lens portion 42 or the frame 41 facing a face of a user who wears the lens portion 42 or the frame 41 and below the nose bridge 43, wherein each of the bent protruding pillars 431 comprises two segments (not shown) extending in different axial directions so that a pair of elastic nose pads 44 can be assembled to the bent protruding pillars 431. The elastic nose pads 44 may be made of a material selected from the group consisting of silica gel, rubber, resin and plastic. In addition, each said elastic nose pad 44 has at least one opening 441 and a cavity 442 extending inwardly from the opening 441 to an interior of the nose pad 44 so that the elastic nose pad 44 can have a recoverable deformation from the opening 441 down to the cavity 442 and then sheath the corresponding bent protruding pillar 431 of the frame 41 when an external force acts thereon. The bent protruding pillar 431 efficiently engages with the cavity 442 of the elastic nose pad 44 by the two segments (not shown) extending in the two different axial directions. Furthermore, due to the elasticity of the nose pad 44, reinstatement of the elastic nose pad 44 after said deformation forces the elastic nose pad 44 itself to combine with the bent protruding pillar 431 so as to achieve a firm combination with reduced risk of accidentally coming off.

In a preferred embodiment, the at least one said cavity 442 of the elastic nose pad 44 engaged with at least one said bent protruding pillar 431 at the nose bridge 43. Namely, the cavity 442 preferably has a diameter slightly smaller than a diameter of the bent protruding pillar 431 so that a combination such formed therebetween can achieve firmness without addition of glue. Of course, the cavity 442 and the bent protruding pillar 431 may be alternatively combined by means of clearance fix.

Besides, the at least one said cavity 442 of the elastic nose pad 44 and the at least one said bent protruding pillar 431 at the nose bridge 43, which are combined by means of engagement or clearance fix, may be formed in various matching forms. In a preferred embodiment, the at least one said cavity 442 of the elastic nose pad 44 and the at least one said bent protruding pillar 431 at the nose bridge 43 may be designed as a round hole and a round post having various diameters while having matching sizes, or may be designed as an elliptic hole and an elliptic post having various diameters while having matching sizes. Of course, in another embodiment, the at least one said cavity 442 of the elastic nose pad 44 and the at least one said bent protruding pillar 431 at the nose bridge 43 may be designed as a square hole and a square post having various diameters while having matching sizes, or may be designed as a rectangle hole and a rectangle post having various diameters while having matching sizes. Further, the cavity 442 of the elastic nose pad 44 and the bent protruding pillar 431 may each have a sectional shape selected from the group consisting of round, elliptic, square, rectangle, diamond, and taper. In practice, the sectional shapes of the cavity 442 of the elastic nose pad 44 and the bent protruding pillar 431 may be of any shape and are not to be limited by the present invention as long as the cavity 442 of the elastic nose pad 44 and the bent protruding pillar 431 can mutually engage.

Moreover, in the above embodiment, the at least one cavity 442 of the elastic nose pad 44 may penetrate through the elastic nose pad 44 and can have a recoverable deformation under an external force to become a shape similar to that of the at least a pair of bent protruding pillars 431 at the nose bridge 43. Meantime, the at least a pair of bent protruding pillars 431 at the nose bridge 43 may be curvedly bent, and may particularly have an angle ranging from approximately 45 to approximately 150 degrees. In a preferred embodiment, the bent protruding pillar 431 has an angle of approximately 90 degrees. However, the bent protruding pillar 431 may be formed in any bent form as long as the bent form can force the cavity 442 of the elastic nose pad 44 to perform said deformation.

Now please refer to FIGS. 3A and 3B again. In each said elastic nose pad 44, a corrugated surface 443 is provided at a side opposite to the side formed with the opening 441, namely the side to contact a nose ridge of a user wearing the eyeglass assembly 40, so as to prevent the elastic nose pad 44 from excessively pressing the user's nose ridge and provide a slight interval between the nose pad 44 and the user's nose ridge for providing a more comfortable wearing experience.

Please refer to FIG. 4 for a third preferred embodiment of the present invention, wherein a method of fabricating an eyeglass assembly comprises steps of:

providing a frame 31 and lenses 32 inlaid in the frame 31, wherein a nose bridge 33 is formed near a center of the frame 31 and corresponding to a nose ridge of a user who wears the eyeglass assembly 30, and a wing portion 311 is extended from each of two sides of the frame 31 and below the nose bridge 33, in which at least one bent protruding pillars 312 is integrally formed at a surface of each of the wing portions 311 facing a face of a user who wears the frame 31 and each of the bent protruding pillars 312 comprises two bent segments (not shown) extending in different axial directions so that a pair of elastic nose pads 34 can be assembled to the bent protruding pillars 312; and providing the said pair of elastic nose pads 34, wherein each said elastic nose pad 34 has at least one opening 341 and a cavity 342 extending inwardly from the opening 341 to an interior of the nose pad 34 so that the elastic nose pad 34 can have a recoverable deformation from the opening 341 down to the cavity 342 and then sheath the corresponding bent protruding pillar 312 of the frame 31 when an external force acts thereon and the bent protruding pillar 312 efficiently engages with the cavity 342 of the elastic nose pad 34 by the two segments (not shown) extending in the two different axial directions.

In a preferred embodiment, the at least one said cavity 342 of the elastic nose pad 34 engaged with at least one said bent protruding pillar 312 at the wing portion 311 of the nose bridge 33. Namely, the cavity 342 preferably has a diameter slightly smaller than a diameter of the bent protruding pillar 312 so that a combination such formed therebetween can achieve firmness without addition of glue. Of course, the cavity 342 and the bent protruding pillar 312 may be alternatively combined by means of clearance fix.

Besides, the at least one said cavity 342 of the elastic nose pad 34 and the at least one said bent protruding pillar 312 at the wing portions 311 of the nose bridge 33, which are combined by means of engagement or clearance fix, may be formed in various matching forms. In a preferred embodiment, the at least one said cavity 342 of the elastic nose pad 34 and the at least one said bent protruding pillar 312 at the wing portion 311 of the nose bridge 33 may be designed as a round hole and a round post having various diameters while having matching sizes, or may be designed as an elliptic hole and an elliptic post having various diameters while having matching sizes. Of course, in another embodiment, the at least one said cavity 342 of the elastic nose pad 34 and the at least one said bent protruding pillar 312 at the wing portion 311 of the nose bridge 33 may be designed as a square hole and a square post having various diameters while having matching sizes, or may be designed as a rectangle hole and a rectangle post having various diameters while having matching sizes. Further, the cavity 342 of the elastic nose pad 34 and the bent protruding pillar 312 may each have a sectional shape selected from the group consisting of round, elliptic, square, rectangle, diamond, and taper. In practice, the sectional shapes of the cavity 342 of the elastic nose pad 34 and the bent protruding pillar 312 may be of any shape and are not to be limited by the present invention as long as the cavity 342 of the elastic nose pad 34 and the bent protruding pillar 312 can mutually engage.

Moreover, in the above embodiment, the at least one cavity 342 of the elastic nose pad 34 may penetrate through the elastic nose pad 34 and can have a recoverable deformation under an external force to become a shape similar to that of the at least a pair of bent protruding pillars 312 at the wing portion 311 of the nose bridge 33. Meantime, the at least a pair of bent protruding pillars 312 at the wing portion 311 of the nose bridge 33 may be curvedly bent, and may particularly have an angle ranging from approximately 45 to approximately 150 degrees. In a preferred embodiment, the bent protruding pillar 312 has an angle of approximately 90 degrees.

Now please refer back to FIG. 2. In each said elastic nose pad 34, a corrugated surface 343 is provided at a side opposite to the side formed with the opening 341, namely the side to contact a nose ridge of a user wearing the eyeglass assembly 30, so as to prevent the elastic nose pad 34 from excessively pressing the user's nose ridge and provide a slight interval between the nose pad 34 and the user's nose ridge for providing a more comfortable wearing experience.

Please refer to FIG. 5 for a fourth preferred embodiment of the present invention, wherein a method of fabricating an eyeglass assembly comprises steps of:

providing an a frame 41 and lens portion 42 inlaid in the frame 41, wherein a nose bridge 43 is formed near a center of the lens portion 42 and corresponding to a nose ridge of a user who wears the lens portion 42, and at least a pair of bent protruding pillars 431 is integrally formed at a surface of the lens portion 42 facing a face of a user who wears the lens portion 42 and each of the bent protruding pillars 431 comprises two bent segments (not shown) extending in different axial directions; and providing a pair of elastic nose pads 44, wherein each said elastic nose pad 44 has at least one opening 441 and a cavity 442 extending inwardly from the opening 441 to an interior of the nose pad 44 so that the elastic nose pad 44 can have a recoverable deformation from the opening 441 down to the cavity 442 and then sheath the corresponding bent protruding pillar 431 of the lens portion 42 when an external force acts thereon and the bent protruding pillar 431 efficiently engages with the cavity 442 of the elastic nose pad 44 by the two segments (not shown) extending in the two different axial directions.

In a preferred embodiment, the at least one said cavity 442 of the elastic nose pad 44 engaged with at least one said bent protruding pillar 431 at the nose bridge 43. Namely, the cavity 442 preferably has a diameter slightly smaller than a diameter of the bent protruding pillar 431 so that a combination such formed therebetween can achieve firmness without addition of glue. Of course, the cavity 442 and the bent protruding pillar 431 may be alternatively combined by means of clearance fix.

Besides, the at least one said cavity 442 of the elastic nose pad 44 and the at least one said bent protruding pillar 431 at the nose bridge 43, which are combined by means of engagement or clearance fix, may be formed in various matching forms. In a preferred embodiment, the at least one said cavity 442 of the elastic nose pad 44 and the at least one said bent protruding pillar 431 at the nose bridge 43 may be designed as a round hole and a round post having various diameters while having matching sizes, or may be designed as an elliptic hole and an elliptic post having various diameters while having matching sizes. Of course, in another embodiment, the at least one said cavity 442 of the elastic nose pad 44 and the at least one said bent protruding pillar 431 at the nose bridge 43 may be designed as a square hole and a square post having various diameters while having matching sizes, or may be designed as a rectangle hole and a rectangle post having various diameters while having matching sizes. Further, the cavity 442 of the elastic nose pad 44 and the bent protruding pillar 431 may each have a sectional shape selected from the group consisting of round, elliptic, square, rectangle, diamond, and taper. In practice, the sectional shapes of the cavity 442 of the elastic nose pad 44 and the bent protruding pillar 431 may be of any shape and are not to be limited by the present invention as long as the cavity 442 of the elastic nose pad 44 and the bent protruding pillar 431 can mutually engage.

Moreover, in the above embodiment, the at least one cavity 442 of the elastic nose pad 44 may penetrate through the elastic nose pad 44 and can have a recoverable deformation under an external force to become a shape similar to that of the at least a pair of bent protruding pillars 431 at the nose bridge 43. Meantime, the at least a pair of bent protruding pillars 431 at the nose bridge 43 may be curvedly bent, and may particularly have an angle ranging from approximately 45 to approximately 150 degrees. In a preferred embodiment, the bent protruding pillar 431 has an angle of approximately 90 degrees.

Now please refer back to FIGS. 3A and 3B. In each said elastic nose pad 44, a corrugated surface 443 is provided at a side opposite to the side formed with the opening 441, namely the side to contact a nose ridge of a user wearing the eyeglass assembly 40, so as to prevent the elastic nose pad 44 from excessively pressing the user's nose ridge and provide a slight interval between the nose pad 44 and the user's nose ridge for providing a more comfortable wearing experience.

Figure 6:
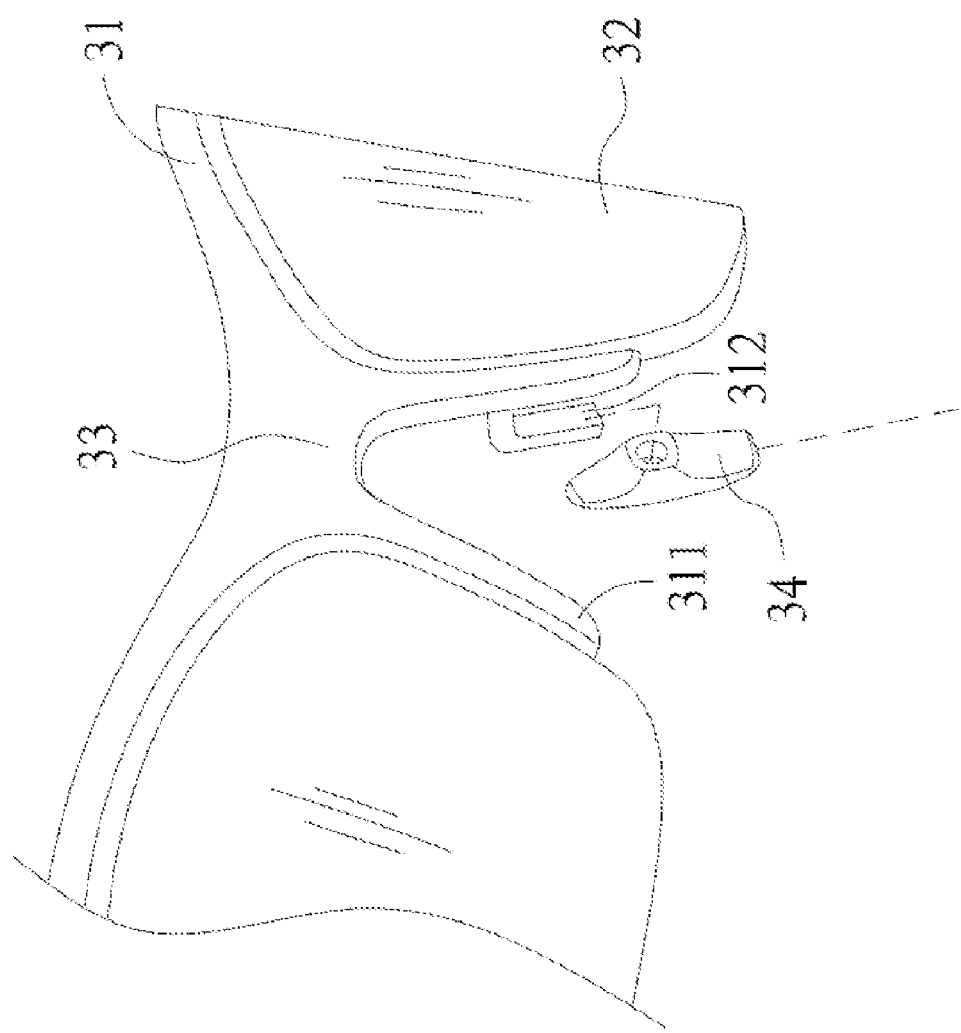
FIG. 6 is a schematic drawing showing an eyeglass nose pad of the present invention.

Referring to FIG. 6, a fifth preferred embodiment of the present invention is provided. Therein, a frame 31 has a nose bridge 33 formed near a center thereof and corresponding to a nose ridge of a user who wears the frame 31. A wing portion 311 is extended from each of two sides of the frame 31 and below the nose bridge 33. The present embodiment is characterized in that at least one bent protruding pillar 312 is integrally formed at a surface of each of the wing portions 311 facing a face of a user who wears the frame 31, wherein each of the bent protruding pillars 312 comprises two segments (not shown) extending in different axial directions so that a pair of elastic nose pads 34 can be assembled to the bent protruding pillars 312. The bent protruding pillar 312 efficiently engages with the cavity 342 of the elastic nose pad 34 by the two segments (not shown) extending in the two different axial directions.

Moreover, in a preferred embodiment, the at least one said bent protruding pillar 312 at the wing portion 311 of the nose bridge 33 may be designed as a round post or an elliptic post having various diameters. Of course, in another embodiment, the at least one said bent protruding pillar 312 at the wing portion 311 of the nose bridge 33 may be designed as a square post or a rectangle post having various diameters.

Meantime, the at least a pair of bent protruding pillars 312 at the wing portion 311 of the nose bridge 33 may be curvedly bent, and may particularly have an angle ranging from approximately 45 to approximately 150 degrees. In a preferred embodiment, the bent protruding pillar 312 has an angle of approximately 90 degrees.

Referring to FIG. 3A, a sixth preferred embodiment of the present invention provides an eyeglass lens portion 42, wherein a nose bridge 43 is formed near a center of the lens portion 42 and corresponding to a nose ridge of a user who wears the lens portion 42 and at least a pair of bent protruding pillars 431 is integrally formed at a surface of lens portion 42 facing a face of a user who wears the lens portion 42 or the frame 41 and below the nose bridge 43, in which each of the bent protruding pillars 431 comprises two segments (not shown) extending in different axial directions so that a pair of elastic nose pads 44 can be assembled to the bent protruding pillars 431. The bent protruding pillar 431 efficiently engages with the cavity 442 of the elastic nose pad 44 by the two segments (not shown) extending in the two different axial directions.

In a preferred embodiment, the at least one said bent protruding pillar 431 at the nose bridge 43 may be designed as a round post or an elliptic post having various diameters. Of course, in another embodiment, the at least one said bent protruding pillar 431 at the nose bridge 43 may be designed as a square post or a rectangle post having various diameters.

Meantime, the at least a pair of bent protruding pillars 431 at the nose bridge 43 may be curvedly bent, and may particularly have an angle ranging from approximately 45 to approximately 150 degrees. In a preferred embodiment, the bent protruding pillar 431 has an angle of approximately 90 degrees.

Besides, in the above embodiment, the lens portion 42 may be integrally formed to have a continuous curved contour. Alternatively, a transitional portion is formed at the center of the lens portion 42 so that the lens portion 42 has a discontinuous curved contour.

Seeing FIG. 6, a seventh preferred embodiment of the present invention provides an elastic nose pad 34 for being assembled to a bent protruding pillar 312 at any one of a frame 31 and lenses 32. The bent protruding pillars 312 referred to a pair of bent structures formed at a lower end of a center of any one of the lenses 32 and the frame 31 to a face and being close to a nose ridge of a user wearing the frame 31. The elastic nose pad 34 is characterized in at least one opening 341 and a cavity 342 extending inwardly from the opening 341 to an interior of the nose pad 34 so that the elastic nose pad 34 can have a recoverable deformation from the opening 341 down to the cavity 342 and then sheath the corresponding bent protruding pillar 312 of the frame 31 when an external force acts thereon. The bent protruding pillar 312 efficiently engages with the cavity 342 of the elastic nose pad 34 by the two segments (not shown) extending in the two different axial directions. In addition, the elastic nose pads 34 may be made of a material selected from the group consisting of silica gel, rubber, resin and plastic.

In the above preferred embodiment, the at least one said cavity 342 of the elastic nose pad 34 may be designed as a round hole or an elliptic hole having various diameters. Of course, in another embodiment, the at least one said cavity 342 of the elastic nose pad 34 may be designed as a square hole or a rectangle hole having various diameters. Moreover, in the above embodiment, the at least one cavity 342 of the elastic nose pad 34 may penetrate through the elastic nose pad 34. Further, the cavity 342 of the elastic nose pad 34 and the bent protruding pillar 312 may each have a sectional shape selected from the group consisting of round, elliptic, square, rectangle, diamond, and taper. In practice, the sectional shapes of the cavity 342 of the elastic nose pad 34 and the bent protruding pillar 312 may be of any shape and are not to be limited by the present invention as long as the cavity 342 of the elastic nose pad 34 and the bent protruding pillar 312 can mutually engage.

Please refer back to FIG. 2 again. In each said elastic nose pad 34, a corrugated surface 343 is provided at a side opposite to the side formed with the opening 341, namely the side to contact a nose ridge of a user wearing the eyeglass assembly 30, so as to prevent the elastic nose pad 34 from excessively pressing the user's nose ridge and provide a slight interval between the nose pad 34 and the user's nose ridge for providing a more comfortable wearing experience.

What is claimed is:

1. An eyeglass assembly, comprising a frame and lenses inlaid in the frame, and having a nose bridge formed near a center of the frame corresponding to a nose ridge of a user who wear the eyeglass assembly and a wing portion extended from each of two sides of the frame and below the nose bridge for holding the lenses, which is characterized in that at least one bent protruding pillar is integrally formed at a surface of each of the wing portions facing a face of the user, and each said bent protruding pillar comprises two segments extending in different axial directions so that a pair of elastic nose pads can be assembled to the bent protruding pillars, wherein each said elastic nose pad has at least one opening and a cavity extending inwardly from the opening to an interior of the nose pad so that when an external force acts on the elastic nose pad, the elastic nose pad can have a recoverable deformation from the opening down to the cavity and thereby the corresponding bent protruding pillar of the frame can be inserted in the cavity.

2. The eyeglass assembly of claim 1, wherein the bent protruding pillar and the cavity of the elastic nose pad engage mutually.

3. The eyeglass assembly of claim 1, wherein the cavity of the elastic nose pad is capable of elastically deforming into a shape similar to a shape of the bent protruding pillar.

4. The eyeglass assembly of claim 1, wherein the elastic nose pad is made of a material selected from the group consisting of silica gel, rubber, resin and plastic.

5. The eyeglass assembly of claim 1, wherein a corrugated surface is provided at a side of the elastic nose pad opposite to the side formed with the opening.

6. The eyeglass assembly of claim 1, wherein the cavity of the elastic nose pad penetrates through the elastic nose pad.

7. The eyeglass assembly of claim 1, wherein the cavity of the elastic nose pad has a sectional shape selected from the group consisting of round, elliptic, square, rectangle, diamond, and taper.

8. The eyeglass assembly of claim 1, wherein the bent protruding pillar has an angle ranging from approximately 45 to approximately 150 degrees.

9. The eyeglass assembly of claim 8, wherein the bent protruding pillar has an angle of approximately 90 degrees.

10. The eyeglass assembly of claim 1, wherein the bent protruding pillar is arcuate.

11. The eyeglass assembly of claim 1, wherein the bent protruding pillar has a sectional shape selected from the group consisting of round, elliptic, square, rectangle, diamond, and taper.

12. The eyeglass assembly of claim 1, wherein the bent protruding pillar engages with the cavity of the elastic nose pad by the two segments extending in the different axial directions.

13. An eyeglass assembly, comprising a frame and a lens portion inlaid in the frame, and having a nose bridge formed near a center of the lens portion corresponding to a nose ridge of a user who wears the eyeglass assembly, wherein at least a pair of bent protruding pillars is integrally formed at a surface of the lens portion facing a face of the user, and each of the bent protruding pillars comprises two segments extending in different axial directions so that a pair of elastic nose pads can be assembled to the bent protruding pillars, wherein, each said elastic nose pad has at least one opening and a cavity extending inwardly from the opening to an interior of the nose pad so that when an external force acts on the elastic nose pad, the elastic nose pad can have a recoverable deformation from the opening down to the cavity and thereby the corresponding bent protruding pillar of the frame can be inserted in the cavity.

14. The eyeglass assembly of claim 13, wherein the lens portion comprises two separate lenses or an integral lens.

15. A method of fabricating an eyeglass assembly, comprising steps of:
   providing a frame and lenses inlaid in the frame, wherein a nose bridge is formed near a center of the frame and corresponding to a nose ridge of a user who wears the eyeglass assembly, and a wing portion is extended from each of two sides of the frame and below the nose bridge for holding the lenses, in which at least one bent protruding pillars is integrally formed at a surface of each of the wing portions facing a face of the user and each of the bent protruding pillars comprises two bent segments extending in different axial directions; and
   providing a pair of elastic nose pads, wherein each said elastic nose pad has at least one opening and a cavity extending inwardly from the opening to an interior of the nose pad so that when an external force acts on the elastic nose pad, the elastic nose pad can have a recoverable deformation from the opening down to the cavity and thereby the corresponding bent protruding pillar of the frame can be inserted in the cavity.

16. A method of fabricating an eyeglass assembly, comprising steps of:
   providing a frame and a lens portion inlaid in the frame, wherein a nose bridge is formed near a center of the lens portion and corresponding to a nose ridge of a user who wears the eyeglass assembly, and at least a pair of bent protruding pillars is integrally formed below the nose bridge at each of two sides of the lens portion and at a surface of the lens portion facing a face of the user, in which each of the bent protruding pillars comprises two bent segments extending in different axial directions; and
   providing a pair of elastic nose pads, wherein each said elastic nose pad has at least one opening and a cavity extending inwardly from the opening to an interior of the nose pad so that when an external force acts on the elastic nose pad, the elastic nose pad can have a recoverable deformation from the opening down to the cavity and thereby the corresponding bent protruding pillar of the lens portion can be inserted in the cavity.

* * * * *